March 2, 1948. O. BROWNSEY 2,437,069
CLEANING TOOL FOR FOOD TENDERING MACHINES
Filed Oct. 16, 1943 2 Sheets-Sheet 1

Inventor
Oscar Brownsey
By Spencer, Marzall, Johnston & Cook,
Attys

March 2, 1948. O. BROWNSEY 2,437,069
CLEANING TOOL FOR FOOD TENDERING MACHINES
Filed Oct. 16, 1943 2 Sheets-Sheet 2
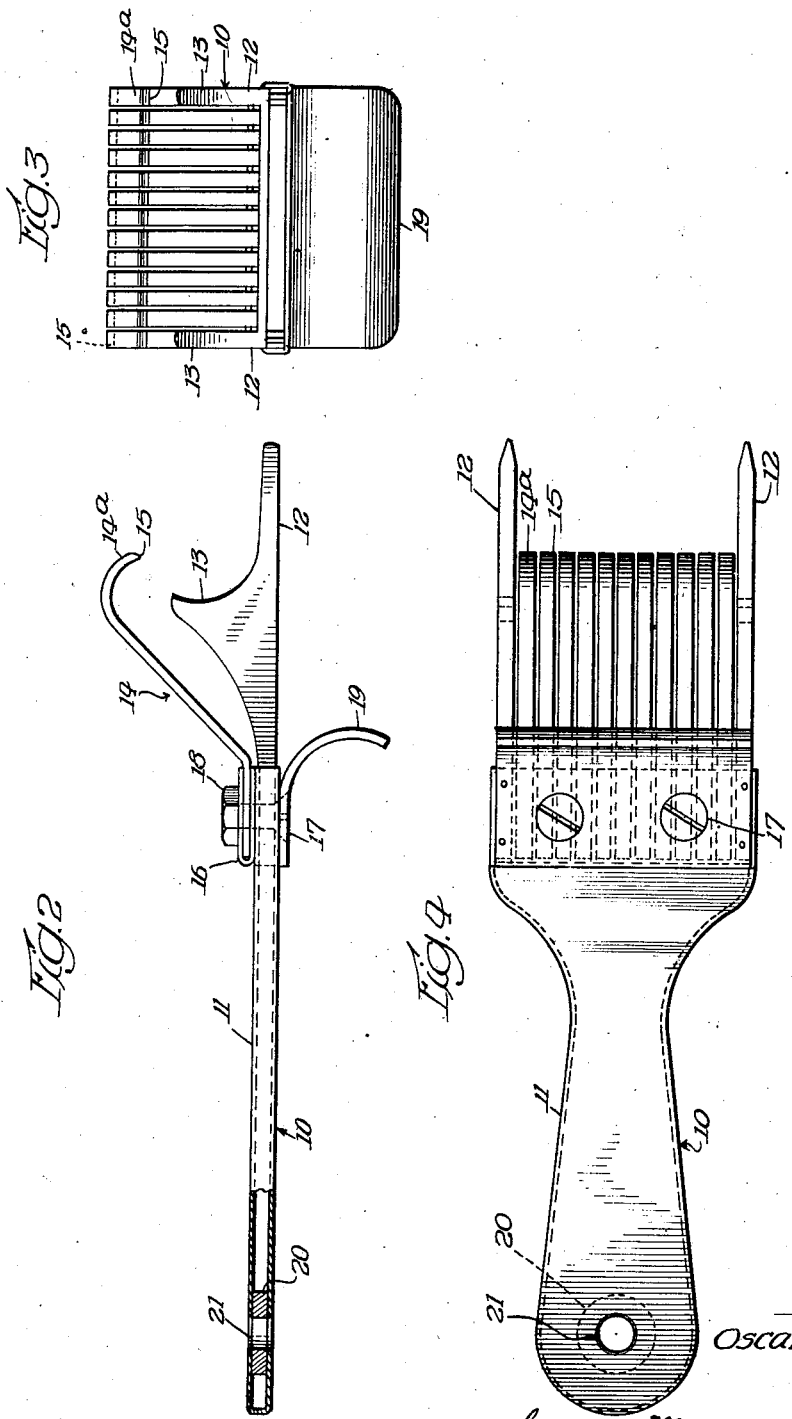
Inventor
Oscar Brownsey
By Spencer, Marzall, Johnston & Cook,
Atty's Patented Mar. 2, 1948

2,437,069

UNITED STATES PATENT OFFICE 2,437,069

CLEANING TOOL FOR FOOD TENDERING MACHINES

Oscar Brownsey, La Porte, Ind., assignor to U. S. Slicing Machine Company, La Porte, Ind., a corporation of Indiana Application October 16, 1943, Serial No. 506,484

14 Claims. (Cl. 17—25)

This invention relates to a tool, and the principal object of the invention is to provide a cleaning tool for use in meat tendering machines to clean away material which may become lodged on the surfaces of tendering knives or blades, as well as to remove particles from the spaces between the cutting knives.

Another important object of the invention is the provision of a cleaning tool for meat tendering machines, the latter having co-operating rotatably mounted shafts, each shaft carrying a plurality of spaced knives, the knives on one shaft entering the spaces between the knives of the co-operating knife carrying shaft, whereby the spaces between knives and the sides of the knives may be cleaned easily and quickly by the positioning of the tool during rotation of the knife shaft.

A further object of the invention is the provision of a meat tendering machine cleaning tool which may be used safely and easily with little effort, which may be made readily and economically and which is efficient in operation.

Numerous other objects and advantages will be apparent throughout the progress of the following specification.

The accompanying drawings illustrate one embodiment of a device incorporating the features of the present invention, in which:

Fig. 2 is a detail side elevational view of the cleaning tool;

Fig. 3 is an end view looking at the right end in Fig. 2; and

Fig. 4 is a bottom plan view of the tool.

Figure 1:
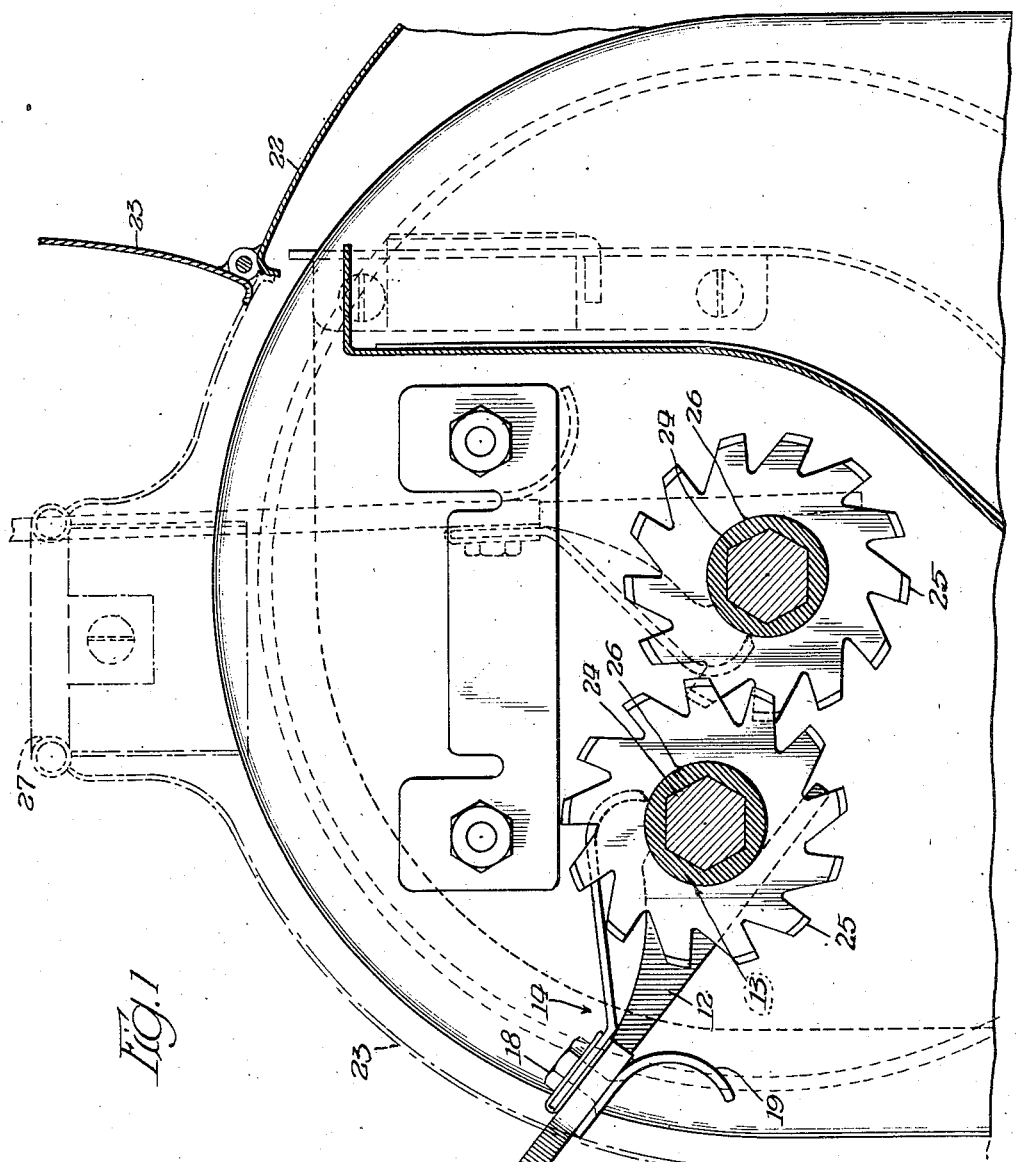
Fig. 1 is a detail sectional view of a meat tendering machine showing the manner in which the improved cleaning tool is applied to remove food particles from the knives and from the spaces between knives.

The particular device herein disclosed for the purpose of illustrating the invention is adapted for cleaning the sides of knives and the spaces between the knives of a meat tendering machine of the type shown in United States Patent 2,409,463, issued October 15, 1946, and assigned to the present assignee.

The cleaning tool 10 herein shown is preferably constructed of stainless steel so that the tool itself may be cleaned easily and kept sanitary. The tool includes a handle 11 which is properly shaped to fit the hand of the user, and is preferably made hollow so that it may be as light in weight as possible and still be rigid and substantial. A pair of spaced stirrups 12 are secured to one end of the handle 11, and these stirrups are preferably spot welded to the handle 11. The stirrups are provided with arcuate bearing surfaces 13 to engage the knife shaft to assist in positioning the tool and to maintain the tool in proper position.

A cleaning comb 14 is rigidly secured to the handle 11, being supported above the stirrups 12 as clearly shown in Figs. 1 and 2. The comb 14 has a plurality of spaced apart cleaning teeth 14a, the outer ends of which are hook-shaped and provided with relatively sharpened ends 15. The teeth 14a may be secured to a U-shaped housing 16, and secured to the handle 11 by means of bolts 17 and nuts 18.

A hand guard 19 is provided to prevent the operator's hand from slipping into the machine, and coming into contact with the sharp knife edges when the tool is used. This guard is secured to the bottom of the handle 11 by the same bolts 17 and nuts 18 which secure the assembly together.

A washer 20 may be welded within the hollow handle 11 at the end away from the cleaning teeth, and a hole 21, of a diameter corresponding to the diameter of the hole in the washer 20, is formed in the handle 11 so that the tool may be hung on a convenient hook at or adjacent the food tendering machine with which it is used.

The food tendering machine with which the tool may be used is of the type disclosed in the aforesaid patent and includes a base 22 and a hinged cover 23 which completely houses the operating mechanism of the machine. Suitable operating mechanism rotates the knife driving shafts 24, which carry a plurality of spaced apart cutting knives 25. The cutting knives 25 are maintained in proper spaced relation by spacers 26 which are mounted on the driving shafts 24 between adjacent ones of the cutting or tendering knives 25. The operation of such a food tendering machine, Fig. 1, contemplates the insertion of a food substance into a slot 27 formed in the cover 23 of the machine so that the substance may be passed between the two knife assemblies and be tendered by the action of the circular knives 25. In so doing, any portions of the food substance which may become lodged on the blades or knives 25, in the spaces between adjoining knives 25, and each shaft 24, may be removed by the use of the tool herein described.

The tendering machine cover 23, Fig. 1, is raised from the dotted to the solid line position to permit the cleaning tool 10 to be placed against the knife assemblies. The cleaning tool is grasped by the handle 11 and the stirrups 12 are inserted in the spaces between knives 25 so that the arcuate bearing surface 13 rests against a pair of the spacing collars 26, whereby the tool may be supported on the rotating shaft and maintained in proper alinement. The knives then engage the spaces between the teeth or prongs 14a of the comb 14 whereby food particles are removed. It is desirable that the radius of the arcuate bearing surface 13 should preferably be made the same as the radius of the spacing collars 26 so that proper alinement may be had between the cleaning tool and the cutting knife assembly.

The cleaning teeth 14a have a width approximating that of the spacing collars 26, and the teeth 14a are spaced one from the other a distance approximating the thickness of the cutting knives 25. Accordingly, when the cutting tool is placed with the stirrups 12 against the collars 26, the cleaning teeth 14a will lie in the spaces between the cutting knives, and will be in a plane above the stirrups 12. That is, a portion of the stirrups will engage the spacers 26 on the side opposite to the side which is engaged by the extremities 15 of the teeth or fingers 14, with the result that the implement may be rocked upon the spacers 26, and in this manner the operator may exert pressure upon the ends 15 of the fingers or prongs 14a of the comb 14. The ends 15 of the teeth 14a are so constructed that they will make a scraping contact with the circumferences of the spacing collars 26, and thereby completely scrape all food scrap out of the spaces between the knives. The cleaning tool is always inserted within the knife assemblies in such a way that the cleaning teeth are held against the direction of rotation. In Fig. 1 the left hand knife assembly rotates clockwise, and the right hand knife assembly rotates counter-clockwise, and accordingly the cleaning tool is shown in a different position with respect to each knife assembly.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. An implement for cleaning knife assemblies which include a plurality of thin, disk-shaped cutting knives spaced along and rotating with a rotatable drive member, said implement comprising a handle adapted to be grasped manually, a group of spaced fingers stationary with respect to each other and carried by the handle, the fingers being substantially as wide as the spaces between knives and the spaces between fingers being substantially the same as the thickness of a knife, and stirrup means carried by the handle and having an arcuate surface to bear against the rotatable drive member to position properly the implement and to maintain the implement in proper alinement.

2. An implement for cleaning knife assemblies which include a plurality of thin, disk-shaped cutting knives spaced along and rotating with a rotatable drive member comprising a handle adapted to be grasped manually, a group of spaced fingers carried by the handle, the fingers being substantially as wide as the spaces between knives and the spaces between fingers being substantially the same as the thickness of a knife, stirrup means carried by the handle and having an arcuate surface to bear against the rotatable drive member to position properly the implement and to maintain the implement in proper alinement, and a guard member secured adjacent the fingers to protect the hand of the operator in applying the implement to a knife assembly.

3. An implement for cleaning knife assemblies which include a plurality of thin, disk-shaped cutting knives spaced along and rotating with a rotatable drive member, said implement comprising a handle adapted to be grasped manually, a group of spaced fingers carried by the handle and stationary with respect to each other, the fingers being substantially as wide as the spaces between knives and the spaces between fingers being substantially the same as the thickness of a knife, and a pair of stirrups arranged in a plane below the fingers and arranged one stirrup on each side of the group of fingers, said stirrups each having an arcuate surface to bear against the rotatable drive member to maintain the implement in proper alinement when applied to an assembly.

4. An implement for cleaning knife assemblies which include a plurality of thin, disk-shaped cutting knives spaced along and rotating with a rotatable drive member, comprising a handle adapted to be grasped manually, a group of spaced fingers carried by the handle, the fingers being substantially as wide as the spaces between knives and the spaces between fingers being substantailly the same as the thickness of a knife, stirrup means carried by the handle and having an arcuate surface to bear against the rotatable drive member to position properly the implement and to maintain the implement in proper alinement, and a housing carrying said group of fingers, said housing being detachably connected to the handle and the stirrup means being integral with the handle.

5. A tool for cleaning the knives of a gang of disk-like knives having spacers between the knives, said tool embodying a handle, a plurality of fingers, each of a size to fit between two adjacent knives, said fingers engaging the spacers, and means also carried by said handle and engaging the spacers on a side opposite to that which is engaged by said fingers, the said handle adapted to rock the said means upon said spacers, whereby to exert pressure by the said fingers upon said spacers.

6. A tool for cleaning the knives of a gang of disk-like knives having spacers between the knives, said tool embodying a handle, a plurality of fingers, each of a size to fit between two adjacent knives, said fingers engaging the spacers, and means also carried by said handle and engaging the spacers on a side opposite to that which is engaged by said fingers, the said handle adapted to rock the said means upon said spacers, whereby to exert pressure by the said fingers upon said spacers, the said means embodying spaced stirrups extending beyond the ends of said fingers.

7. A tool for cleaning the knives of a gang of disk-like knives having spacers between the knives, said tool embodying a handle, a plurality of fingers, each of a size to fit between two adjacent knives, said fingers engaging the spacers, and means also carried by said handle and engaging the spacers on a side opposite to that which is engaged by said fingers, the said handle adapted to rock the said means upon said spacers, whereby to exert pressure by the said fingers upon said spacers, the extremities of said fingers being curved towards the said means, the extremities of said curved portions being shaped to form cutting edges.

8. A tool for cleaning the knives of a gang of disk-like knives having spacers between the knives, said tool embodying a handle, a plurality of fingers, each of a size to fit between two adjacent knives, said fingers engaging the spacers, means also carried by said handle and engaging the spacers on a side opposite to that which is engaged by said fingers, the said handle adapted to rock the said means upon said spacers, whereby to exert pressure by the said fingers upon said spacers, and a hand guard carried by said handle adjacent the said means.

9. A tool for cleaning the knives of a gang of disk-like knives having spacers between the knives, said tool embodying a handle, a plurality of fingers, each of a size to fit between two adjacent knives, said fingers engaging the spacers, means also carried by said handle and engaging the spacers on a side opposite to that which is engaged by said fingers, the said handle adapted to rock the said means upon said spacers, whereby to exert pressure by the said fingers upon said spacers, and a hand guard disposed adjacent said fingers, to protect the operator's hand, the said means being disposed between the said fingers and the hand guard.

10. A tool of the character described, embodying a handle, a shaft engaging stirrup forming an extension of said handle, and a plurality of spaced fingers disposed on one side of said stirrup and inclining upwardly from the handle and away from said stirrup, the extremities of said fingers being curved in a direction towards but spaced from said stirrup.

11. A tool of the character described, embodying a handle, a shaft engaging stirrup forming an extension of said handle, a plurality of spaced fingers disposed on one side of said stirrup and inclining upwardly from the handle and away from said stirrup, the extremities of said fingers being curved in a direction towards but spaced from said stirrup, and a hand guard carried by said handle and disposed on the side of said stirrup opposite to that on which the fingers are situated.

12. A tool of the character described, embodying a handle, a shaft engaging stirrup forming an extension of said handle, and a plurality of spaced fingers disposed on one side of said stirrup and inclining upwardly from the handle and away from said stirrup, the extremities of said fingers being curved in a direction towards but spaced from said stirrup, a portion of said stirrup extending a substantial distance beyond the extremities of said fingers.

13. A tool of the character described, embodying a handle, a shaft engaging stirrup forming an extension of said handle, a plurality of spaced fingers disposed on one side of said stirrup and inclining upwardly from the handle and away from said stirrup, the extremities of said fingers being curved in a direction towards but spaced from said stirrup, said stirrup being fixedly secured to the handle, and means detachably securing said fingers to the handle.

14. A tool of the character described, embodying a handle, a shaft engaging stirrup forming an extension of said handle, a plurality of spaced fingers disposed on one side of said stirrup and inclining upwardly from the handle and away from said stirrup, the extremities of said fingers being curved in a direction towards but spaced from said stirrup, a hand guard carried by the handle and disposed on the opposite side of the stirrup, and means detachably securing the fingers and guard to the handle.

OSCAR BROWNSEY.

REFERENCES CITED

The following references are of record in the file of this patent:

UNITED STATES PATENTS

| Number | Name | Date |
|---|---|---|
| 1,899,433 | Deckert | Feb. 28, 1933 |
| 502,355 | Gailbreath | Aug. 1, 1893 |
| 1,542,757 | Baker | June 16, 1925 |